(12) United States Patent  
Madej

(10) Patent No.: US 7,093,763 B1  
(45) Date of Patent: Aug. 22, 2006

(54) LASER SCANNER HAVING ANALOG DIGITIZER WITH INCREASED NOISE IMMUNITY

(75) Inventor: Dariusz Madej, Shoreham, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 11/066,917

(22) Filed: Feb. 25, 2005

(51) Int. Cl.
  *G06K 7/10* (2006.01)
(52) U.S. Cl. .............................. 235/462.27; 235/462.25
(58) Field of Classification Search ..............................
  235/462.01–462.45, 455, 470, 472.01, 472.02, 235/472.03, 454
  See application file for complete search history.

(56) References Cited

U.S. PATENT DOCUMENTS

| 3,095,541 | A | * | 6/1963 | Ashcraft ....................... 327/74 |
| 4,251,798 | A | | 2/1981 | Swartz et al. |
| 4,360,798 | A | | 11/1982 | Swartz et al. |
| 4,680,457 | A | * | 7/1987 | Robertson .................... 235/470 |
| 5,302,813 | A | | 4/1994 | Goren |
| 5,445,967 | A | * | 8/1995 | Deuter ........................ 436/164 |
| 5,478,997 | A | | 12/1995 | Bridgelall et al. |
| 5,581,072 | A | | 12/1996 | Bridgelall et al. |
| 5,619,028 | A | | 4/1997 | Barkan |
| 5,734,152 | A | * | 3/1998 | Goren et al. ............ 235/462.27 |
| 6,082,621 | A | | 7/2000 | Chan et al. |
| 6,164,540 | A | * | 12/2000 | Bridgelall et al. ...... 235/462.01 |
| 6,170,749 | B1 | | 1/2001 | Goren et al. |
| 6,209,788 | B1 | * | 4/2001 | Bridgelall et al. ...... 235/462.32 |
| 6,328,213 | B1 | | 12/2001 | He et al. |
| 6,478,225 | B1 | | 11/2002 | Swartz et al. |
| 6,547,142 | B1 | | 4/2003 | Goren et al. |
| 6,874,688 | B1 | | 4/2005 | Barkan |
| 2005/0274809 | A1 | * | 12/2005 | Colley ................... 235/462.25 |

* cited by examiner

*Primary Examiner*—Thien M. Le
(74) *Attorney, Agent, or Firm*—Watts Hoffmann Co., LPA

(57) ABSTRACT

A laser scanner for reading a bar code having a plurality of bar code elements. The laser scanner includes a digitizer which receives as an input an analog signal from photodetector circuitry and digitizes the analog signal to produce a digital bar code pattern (DBP) signal representative of the bar code. The DBP signal is input to a decoder which reads and decodes the DBP signal thereby decoding the bar code. The digitizer imposes a short duration correction impulse on the DBP signal whenever successive edges of the same polarity are sensed wherein both of the edges are above a threshold level and further wherein the second edge is of greater magnitude than the first edge. When a correction impulse is received on the DBP signal by the decoder, the decoder corrects the DBP signal by removing the first edge and toggling on the second edge.

21 Claims, 5 Drawing Sheets

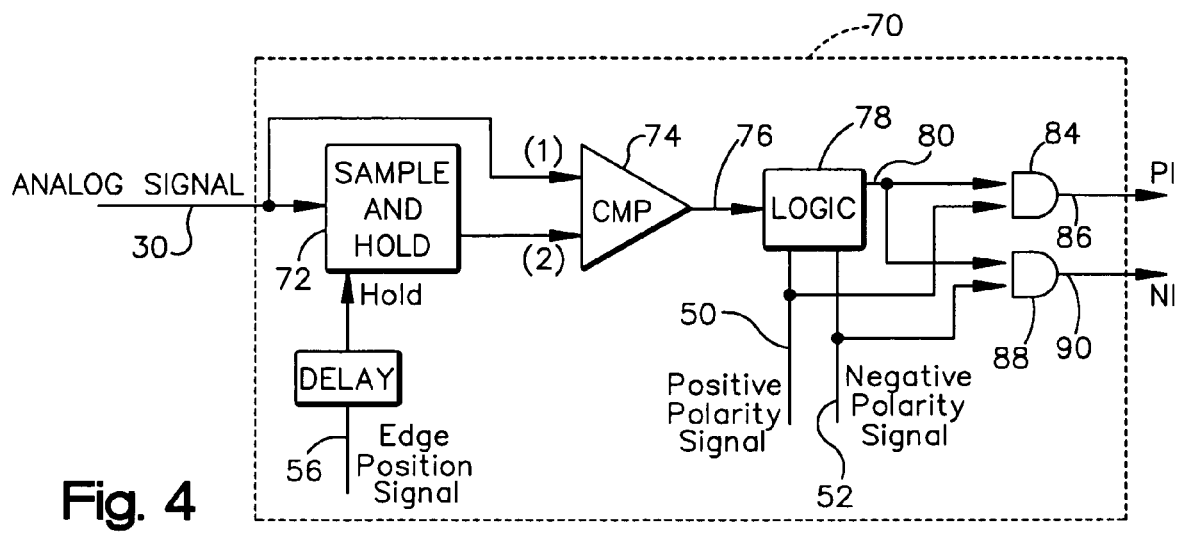
Fig. 4
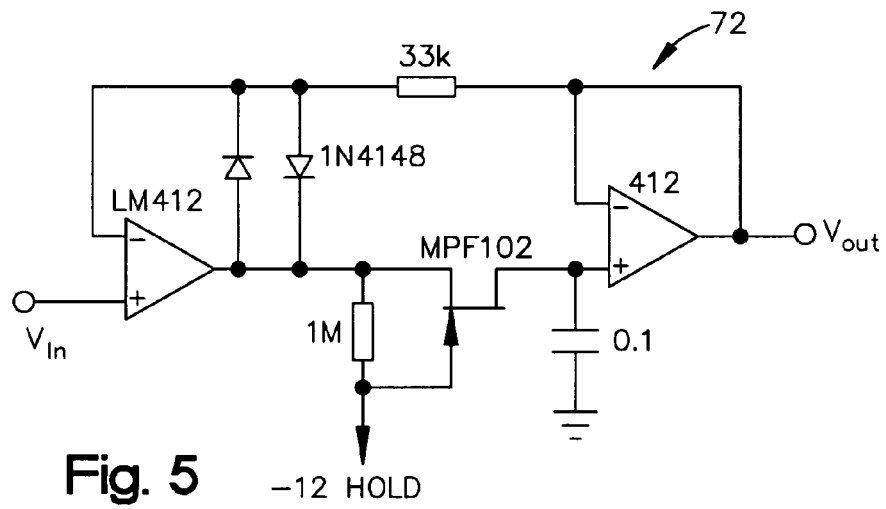
Fig. 5
| CMP Output | x | 0 | 1 | 0 | 1 |
|---|---|---|---|---|---|
| Positive Polarity | 0 | 1 | 1 | 0 | 0 |
| Negative Polarity | 0 | 0 | 0 | 1 | 1 |
| Logic Output | 0 | 0 | 1 | 1 | 0 |
Fig. 6

Edge Correction Algorithm for a Digitizer with "Edge Strength"

Variables
T — array containing the DBP and polarity bits
S — array containing edge strength
No_of_edges — number of edges in T (and S)
I — index to T (for input)
Opt — index to T (for output)

Input
T,
S,
no_of_edges

Output
T — containing modified DBO
new_no_of_edges — length of T

Algorithm

Function Edge_selection (T,S, no_od_edges)    /—100

I=0;      //input index
Opt=0;   //output index e1 = T[I++];
while I<=no_of_edges
 e2 = T[I++];

if(diff_polarity (e1,e2))
        T[Out++]=e1;  //add current edge "e1"
        if (I>no_of_edges) //add last edge
            T[Out++)=e2;
            break;
      else
            e1=e2;
      end
else //same polarity
    //get the sequence of edges of the sabe polarity, there might be more than two in a sequence
    //first is e1==t[i-2]; find the last
    j=I;
    while (j<=no_of_edges & not diff_polarity (e1,T[j]))
         j=j+1;
    end bst = find index of the biggest edge (abs value) from set S[i-2] .. S[j-1]
    // This task can added to the while loop above, not done for clarity sl=sum( T [i-2 .. bgs]);

if(j<no_of_edges) //mIddle of the load
         s2=sum (T [bgs+1..j]);
         T[Out++]=s1;
         T(Out++]=s2;
         el=T[j+1];
         I= j+2;
    else //end of load
         T[Out++]=s1;
         s2=sum (T [bgs+1 .. no_of_edges]);
         if (s2>0)
              T[Out++]=s2;
         end
         break;
    end
  end //if
end //while new_no_edges = Out-1;
return (T, new..no_edges)

Fig. 7B

LASER SCANNER HAVING ANALOG DIGITIZER WITH INCREASED NOISE IMMUNITY

FIELD OF THE INVENTION

The present invention relates to a laser scanner for reading bar codes and, more particularly, to a laser scanner having an analog digitizer with increased noise immunity.

BACKGROUND OF THE INVENTION

Laser scanners are widely used for reading bar codes, including one dimensional and two dimensional bar codes. In a laser scanner, a laser generates a beam, the beam is scanned or rapidly moved across a bar code or a portion of a bar code. Typically, the laser beam is focused by a lens and repetitively scanned by means of an oscillating or rotating mirror. Essentially, the beam generates a beam spot that moves across a target bar code.

The space elements of the bar code reflect the laser beam illumination and the dark or black bar elements of the bar code absorb the laser beam. The reflected light from the bar code is focused by scanner light-receiving optics through a bandpass filter and onto a photodetector circuitry, such as a photodiode. The pattern of reflected light, as received by the photodiode of the laser scanner, is a representation of the pattern of the bar code. That is, a sequence of time when the photodiode is receiving reflected light represents the laser beam spot moving across a space of the bar code, while a sequence of time when the photodiode is not receiving reflected light represents the laser moving across a dark bar. Since the scanning speed or velocity of the laser is known, the elapsed time of the photodiode receiving reflected light can be converted into a width of a bar code element corresponding to a space, while the elapsed time of the photodiode not receiving reflected light can be converted into a width of a bar code element corresponding to a bar.

The photodiode is part of photodiode circuitry which converts the reflected light into an analog signal. The laser scanner includes a digitizer to digitize the analog signal generated by the photodiode. The digitizer outputs a digital bar code pattern (DPB) signal representative of the bar code pattern. A decoder of the laser scanner inputs the DPB signal and decodes the bar code. The decoded bar code typically includes payload information about the product that the bar code is affixed to. Upon successful decoding of the scanned bar code, the scanner may provide an audio and/or visual signal to an operator of the scanner to indicate a successful read and decode of the bar code. The scanner typically includes a display to display payload information to the operator and a memory to store information decoded from the bar code.

To successfully read and decode a bar code, the digitizer must accurately interpret the analog signal output by the photodiode circuitry and determine where the edges, that is, the transition points of successive bar code elements are. Noise makes the digitization process problematic. Noise can include optical noise such as ambient light, paper grain or speckle noise, printing defects. Noise may also include electrical sources of noise such as radiated (EMI) or conducted (scanner circuitry induced noise). A digitizer must differentiate the signal representative of the bar code pattern from various sources of noise. Typically, digitizers use an edge detection process wherein an edge transition (black to white (bar to space) or white to black (space to bar)) between bar code elements is deemed to have been detected only if the level of the differentiated signal is above a specified or predetermined threshold. Additional criteria that may be used include amount of signal drop from its pick value or changing of direction of the differentiated signal. Such features give the digitizer a degree of noise immunity, that is, reducing the possibility that edge detection was triggered by noise rather than the bar code element edge transition.

The edge detection process of the digitizer also requires that the edge polarities have to alternate. Edge polarity tells whether the edge marks a transition from space to a bar (positive-going edge or positive edge) or a transition from bar to a space (negative-going edge or negative edge). By requiring alternating edges, the edge detection process ensures that the resulting DBP signal represent a sequence of bar code elements that are properly ordered as: bar-space-bar-space-bar-space, etc.

Alternating polarity edge detection is suitable when the analog bar code signal from the photodiode is not noisy. However, noise and the convolution effect of the laser beam may cause a distortion of the photodiode analog signal such that two or more consecutive edges of the signal may have the same polarity. Empirical evidence suggests that when the signal-to-noise ratio (SNR) of the analog signal drops below a certain value, the probability of such a situation increases significantly and at SNR<=8 dB consecutive edges having the same polarity becomes very likely.

FIG. 1 illustrates the problem with alternating edge polarity edge detection. FIG. 1 is a plot of analog voltage output of photodiode circuitry (including voltage control circuitry and a differentiator) versus time. Typically, the analog voltage output 30 is the first derivative of the photodiode current. A negative polarity edge labeled A is below a predetermined edge detection threshold −T. (The edge detection threshold −T may be a static value or a dynamic value which changes based on various scanning parameters.) Thus, a digitizer utilizing alternating edge polarity will toggle the DBP line low at the location of point A, signaling the beginning of a space of the bar code pattern. The next edge B is above a positive edge threshold +T and would cause the digitizer to toggle the DBP line high. However, edge B is caused by noise and, in fact, edge C should be the proper transition point between bar code elements E1 and E2 rather than point B. However, since the transition of the DBP signal has already occurred at edge B, it can not be reversed at edge C since edges B and C are of the same polarity. The digitizer will toggle the DBP line low next at edge D, an edge with negative polarity marking the end of the bar representing element E2.

What this means is that the decoder receiving the DBP signal as an input will calculate a width of both successive bar code elements E1, E2 improperly. The DBP signal output by the digitizer will result in the decoder calculating the width of bar code element E1 as corresponding to the elapsed time (where elapsed time is the surrogate of distance or element width) between edges A and B, when element E1 should correctly have a width corresponding to the elapsed time between edges A and C. Thus, the calculated width of element E1 will be too short. Similarly, the DBP signal output by the digitizer will result in the decoder calculating the width of bar code element E2 as corresponding to the elapsed time between edges B and D, when element E2 should correctly have a width corresponding to the elapsed time between edges C and D. Thus, the calculated width of element E1 will be too long. If the width error of element E1 exceeds the narrowest element width for the bar code, the decoder will incorrectly read the bar width of point B to point D as including one extra bar code element width.

Another similar case is marked as points X, Y, Z. In both situations, the digitizer error leads to an error in bar code element width. This has disastrous consequences for the scanner decoder. In case of symbologies, which use all element combinations, like UPC such situation leads to character misclassification. That results in a failure to decode, however if more than one such error occurs for a single symbol, then that may result in symbol misdecode. The danger of misdecode is increased, if a symbol is decoded using fragments of a bar code coming from separate scans, like it is in case of block decoding or even more often in the case of half block stitching.

What is needed is a digitizer which mitigates DBP distortion resulting from receiving an analog signal having two successive edges of the same polarity.

SUMMARY OF THE INVENTION

The present invention is directed to a laser scanner for reading a bar code having a plurality of bar code elements. The laser scanner includes a digitizer which receives as an input an analog signal from a photodetector circuitry and digitizes the analog signal to produce a digital bar code pattern (DBP) signal representative of the bar code. The DBP signal is input to a decoder which reads and decodes the DBP signal thereby decoding the bar code. The digitizer imposes a short duration correction impulse on the DBP signal whenever the digitizer determines successive edges of the same polarity wherein both of the edges are above a threshold level that would cause the DBP signal output to switch and further wherein the second edge is of greater magnitude than the first edge. When a correction impulse is received by the decoder, the decoder appropriately corrects to DBP to ignore the first edge. This mitigates errors in decoding a bar code under high noise conditions.

The laser scanner of the present invention includes:

a) a laser generating a beam scanned over a target bar code;

b) photodetector circuitry receiving light reflected from the target bar code and generating a time-varying analog signal representative of the target bar code;

c) a digitizer coupled to the photodetector circuitry and receiving as an input the analog voltage signal of the photodetector circuitry and generating:

1) a digital bar code pattern signal toggling between a first state and a second state, the digital bar code pattern signal being switched to the first state when a positive polarity edge of the analog signal is sensed having a magnitude exceeding a predetermined threshold and switching to the second state when a negative polarity edge of the analog signal is sensed having a magnitude exceeding a predetermined threshold; and 2) a short duration correction impulse generated when a second edge is sensed wherein the second edge has the same polarity as an immediately preceding first edge and further wherein a magnitude of the second edge is greater than a magnitude of the first edge, the impulse signal being imposed on the digital bar code pattern signal and having a state opposite of a present state of digital bar code pattern signal; and d) a decoder coupled to the digitizer, receiving the digital bar code pattern signal, determining widths of successive bar code elements of the target bar code, and decoding the target bar code, a width of a bar code element corresponding to a duration of an interval when the digital bar code pattern signal remains in a given one of the first and second states, except that when a short duration impulse is sensed on the digital bar code pattern signal, a state of an interval immediately prior to the impulse is interpreted by the decoder to be an opposite state of the state of the interval and a duration of the interval is added to a duration of an interval immediately preceding the interval.

The correction impulse has a duration shorter than a duration of a bar code element having narrowest width of the plurality of bar code elements. The digitizer of the present invention increases digitizer immunity to high noise and improves decoding rates for noisy bar code signals and reduces misdecodes.

These and other objects, advantages, and features of the exemplary embodiment of the invention are described in detail in conjunction with the accompanying drawings.

BRIEF DESCRIPTION OF THE DRAWINGS

FIG. 4 is an impulse generation circuit of the digitizer of FIG. 2 for generating correction impulses when two successive edges of the same polarity are sensed, the edges having a magnitude greater than a predetermined threshold and the second edge having magnitude greater than the first edge;

FIG. 5 is a sample and hold circuit which is a component of the impulse generation circuit of FIG. 4;

FIG. 6 is a logic table for the impulse generation circuit of FIG. 4;

FIG. 7B is second portion of the flow chart for an error correction algorithm for a decoder where the decoder receives an enhanced DBP signal that includes edge strength values in addition to a timing pattern of bar code element transitions.

DETAILED DESCRIPTION

Figure 2:
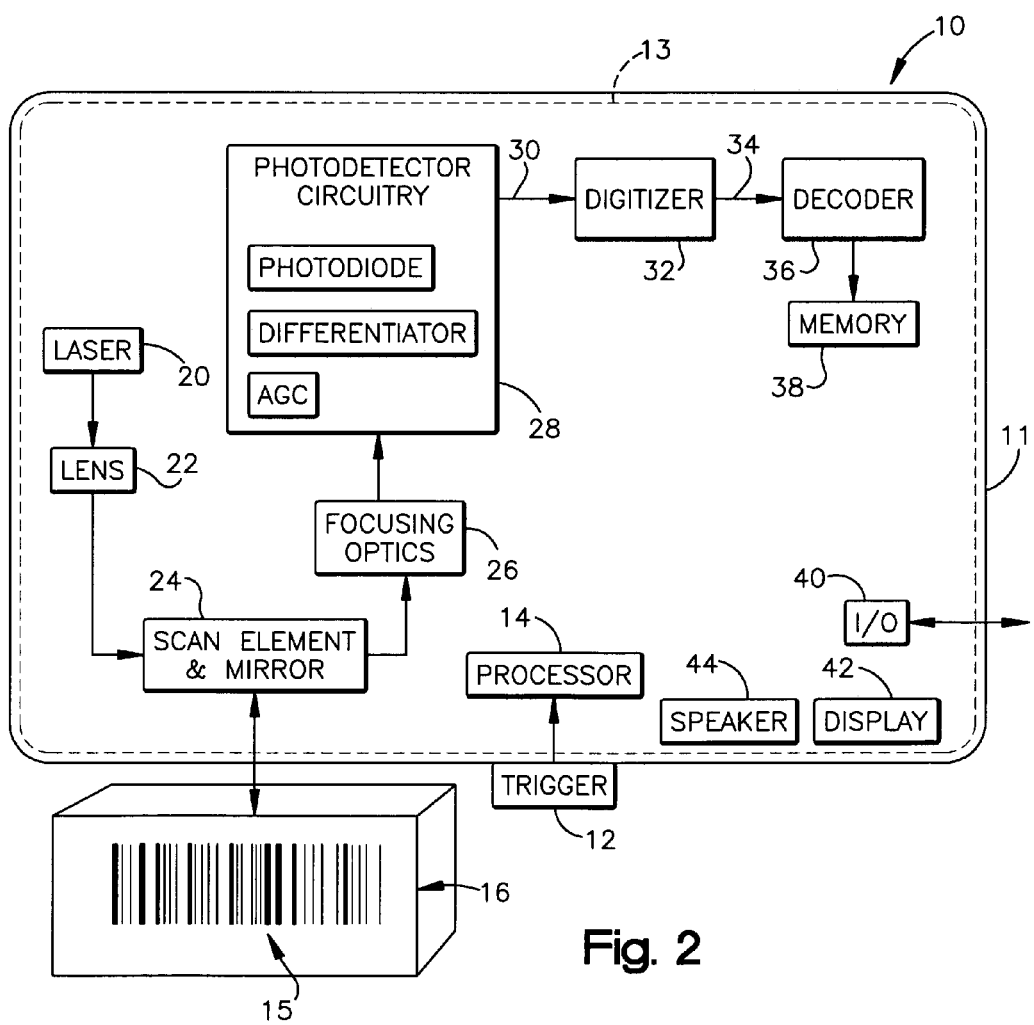
FIG. 2 is block diagram of a laser scanner of the present invention.

A laser scanner is shown schematically at 10 in FIG. 2. The bar code reader 10, in addition to reading (that is, scanning and decoding) both 1D and 2D bar codes and postal codes, is also capable of capturing images and signatures. In one preferred embodiment of the present invention, the laser scanner 10 is a hand held portable reader supported in a housing 11 that can be carried and used by a user walking or riding through a store, warehouse or plant for reading bar codes for stocking and inventory control purposes.

However, it should be recognized that digitizing and decoding system of the present invention, to be explained below, may be advantageously used in connection with any type of laser scanner, be it portable or stationary. It is the intent of the present invention to encompass all such laser scanners.

The bar code reader 10 includes a trigger 12 coupled to the bar code reader circuitry 13 operating under the control of a microprocessor 14 for reading of a target bar code 15 affixed to a product 16 when the trigger 12 is pulled or pressed. The bar code reader 10 includes a laser 20 which generates a laser beam which is focused by a focusing lens 22. The beam is caused to move in an oscillatory pattern across the bar code 15 by a scan element and mirror assembly 24. Focusing optics 26 focus reflected light from the target bar code 15 onto a photodetector circuitry 28.

The photodetector circuitry 28 includes a photodetector, such as a photodiode, voltage control circuitry such as an automatic gain control (AGC) circuit, and a differentiator which functions to differentiate a current output signal of the photodiode and generates an analog voltage output 30. The voltage output 30 of the photodiode 28 represents the pattern of the target bar code 15 as dark bars of the bar code have minimal reflectance of the scanned laser beam light while the spaces of the bar code 15 have high reflectance of the scanned laser beam light. The magnitude of the analog voltage output 30 thus represents the pattern of the bar code 15.

The analog voltage signal 30 output by the photodetector circuitry 28 is coupled to a digitizer 32. The digitizer 32 converts the analog voltage output 30 into a digital signal 34 representative of the bar code pattern. The digital output 34 is typically referred to as a binary bar code pattern (DBP) signal 34. Essentially it is a two state binary output (high and low states) where a transition from low to high is indicative of a transition from a space to a bar in the bar code pattern and a transition from high to low is indicative of a transition from a bar to a space in the bar code pattern. The time or duration of a high or low output of the DBP signal 34 corresponds to a width of a bar code element (space or bar) in the bar code pattern. Since the velocity of the scan across the target bar code 15 is known, the duration of a high or low state may be directly converted into a width of each bar code element of the bar code 15.

The DBP signal 34 is coupled to a decoder 36 which receives the DBP signal 34 and decodes the bar code pattern represented by the signal. The bar code 15 includes payload information regarding the associated product 16 as well as authentication information (e.g., digital signature) for authenticating the bar code 15 and/or the product 16.

The decoded information from the bar code 15 may be stored in memory 38 and/or output to a remote computer via I/O circuitry 40 (e.g., serial/parallel ports, rf circuitry, etc.). Successful decoding of the target bar code 15 may be indicated to an operator of the scanner 10 by a visual display 42 and/or an audio tone emitted by a speaker 44.

Digitizing the Analog Voltage Signal 30

Figure 1:
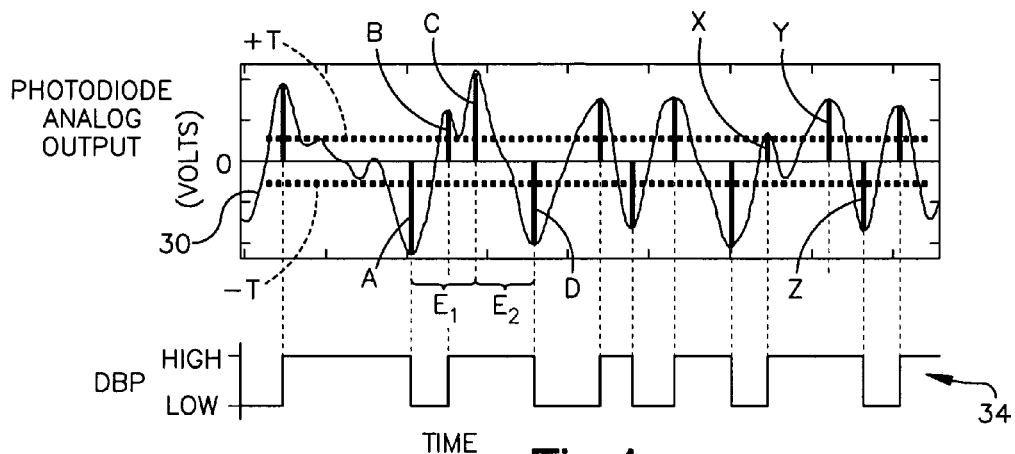
FIG. 1 is a graph of an analog voltage output signal input to a digitizer of a laser scanner and a digital barcode pattern (DBP) signal output by the digitizer.
Figure 3:
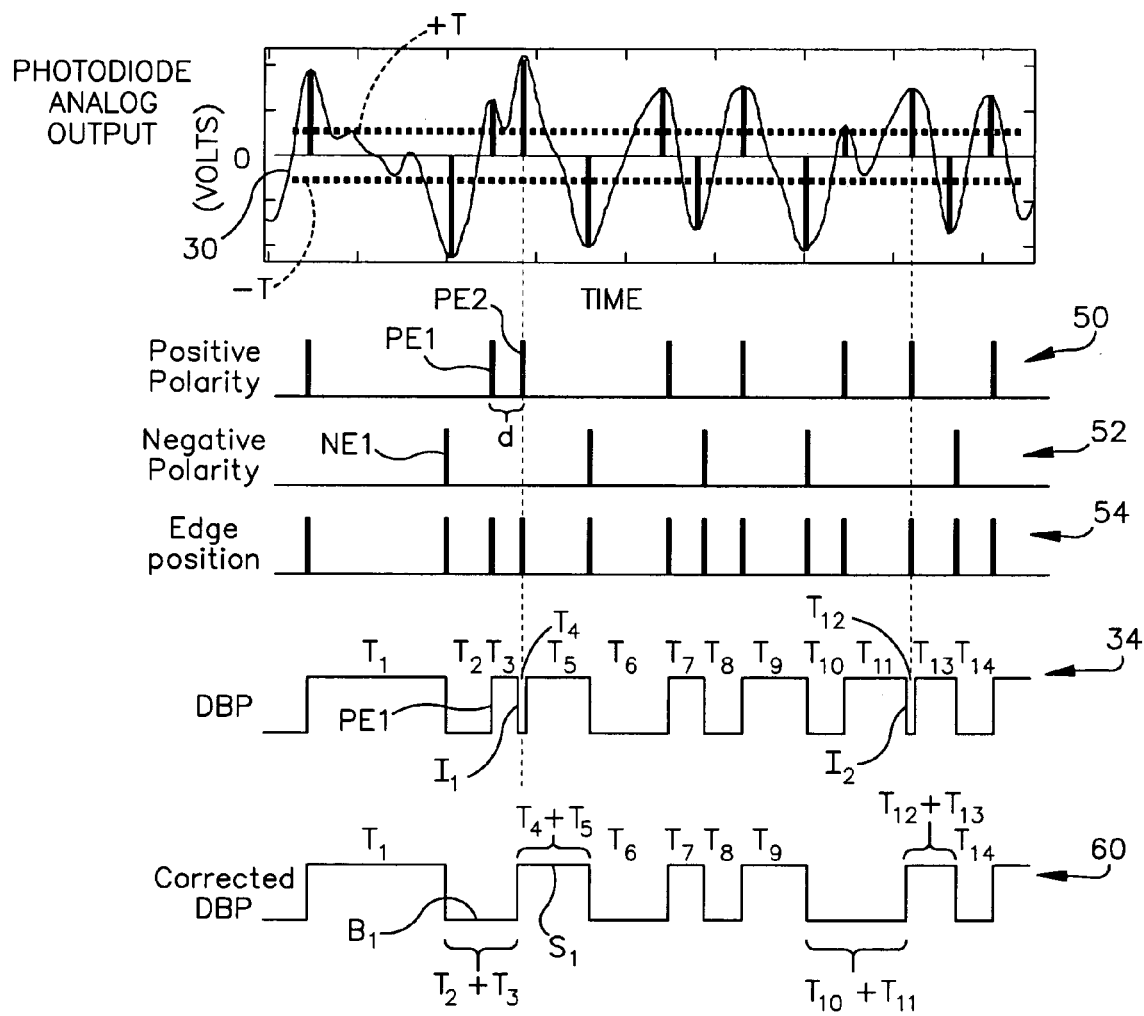
FIG. 3 includes timing diagrams and graphs of photodetector circuitry and digitizer of the laser scanner of FIG. 2 including an analog voltage output signal of the photodetector circuitry, a digital barcode pattern (DBP) signal output by a digitizer having correction impulses and a corrected DBP, as would be interpreted by a decoder of the laser scanner upon receiving the DBP signal from the digitizer.

The output of the photodiode 28 is the analog voltage signal 30. The analog signal 30 is a time-varying signal whose magnitude is representative of the intensity of the light reflected off successive portions of the bar code 15. Thus, the signal 30 is representative of the pattern of white spaces and black bars of the bar code. Since the scanning velocity is known, the durations of portions of the signal 30 can directly be converted into widths of bar code elements of the bar code 15. Thus, while the following discussion will refer to durations of signal, it should be understood that signal duration is directly converted into distances regarding the width of bar code elements to be scanned and decoded. An exemplary analog voltage signal 30 is shown in FIGS. 1 and 3. The analog voltage signal 30 is converted by the digitizer 32 into the DBP signal 34, which is also representative of the pattern of white spaces and black bars of the bar code 15.

As explained above, to generate a digital output, that is, toggling the DBP signal high or low, the digitizer 32 must determine when edges in the analog signal 30 occur that represent transition points between bar code elements, i.e., the end of a bar element and the beginning of a space element or the end of a space element and the beginning of a bar element. A transition point or edge is identifiable as a peak or local maximum in the analog signal 30. The digitizer 32 utilizes an edge detection process to determine when an edge is encountered in the analog signal 30. The process includes the use of edge threshold voltage values (labeled +T, −T in FIGS. 1 and 3). The edge threshold voltage values may be fixed or may change dynamically based on characteristics of the bar code being scanning, lighting conditions, etc. A transition point in the analog signal 30 will not be deemed as an edge that results in toggling the DBP signal 34 by the digitizer unless the magnitude of the edge exceeds the appropriate threshold voltage value. That is, the DBP signal 34 will toggle if a positive-going edge exceeds the +T threshold or if a negative-going edge exceeds the −T threshold. As can be seen in FIGS. 1 and 3, the edges that exceed the respective positive and negative threshold voltage values are marked with vertical lines, for example, edges labeled A, B, C, D, X, Y, Z in FIG. 1.

The edge detection process of the digitizer 32 also requires that the edge polarities have to alternate. Edge polarity indicates whether the edge marks a transition from bar to space (negative-going edge or negative edge) or a transition from space to bar (positive-going edge or positive edge). By requiring alternating edges, the edge detection process ensures that the resulting DBP signal 34 represent a sequence of bar code elements that are properly ordered as: bar-space-bar-space-bar-space, etc.

As explained above, alternating polarity edge detection is suitable when the analog bar code signal from the photodetector is not noisy. However, noise and the convolution effect of the laser beam may cause a distortion of the photodetector circuitry analog signal 30 such that two or more consecutive edges of the analog signal may have the same polarity. The edge detection process of the digitizer 32 of the present invention advantageously will:

1) Detect two consecutive edges having the same polarity;
2) Determine which edge of the sequences of edges of the same polarity is the proper one;
3) Remove the wrong edge and leave the proper edge; and
4) Generate an appropriate DBP signal.

In order to detect two edges of the same polarity, the digitizer generates the following signals:

1) Positive polarity signal—shown at 50 in FIG. 3. A spike or impulse is generated when the digitizer 32 senses a positive polarity edge or transition on the photodetector circuitry analog signal 30 having a positive voltage magnitude greater than +T.

2) Negative polarity signal—shown at 52 in FIG. 3. A spike or impulse is generated when the digitizer 32 senses a negative polarity edge or transition on the photodiode analog signal 30 having a negative voltage magnitude less than −T.

3) Edge position signal—shown at 54 in FIG. 3. A spike or impulse is generated when the digitizer 32 senses either a positive or negative polarity edge having a magnitude greater than +T or less than −T.

The DBP signal 34 is toggled on (logic high state) by the positive polarity signal 50 (edges of a positive polarity) and off (logic low state) by the negative polarity signal 52 (edges of a negative polarity). If two consecutive edges of the same polarity are encountered, for example, the spikes or impulses labeled PE1, PE2 in the positive polarity signal 50, the following decision rule is applied by the edge detection processing logic of the digitizer 32:

1) If an absolute magnitude of the first edge is greater than or equal to an absolute magnitude of the second edge, that is, an edge strength of the first edge is greater than or equal to an edge strength of the second edge, the second edge is ignored. That is, the DBP signal 34 will toggle on the first edge and the second edge will be ignored.

2) If an absolute magnitude of the second edge is greater than an absolute magnitude of the first edge, that is, an edge strength of the second edge exceeds the edge strength of the first edge, the first edge is ignored and the second edge will be considered the transition to a new bar code element.

This is the case with positive edges or impulses PE1 and PE2, where the edge strength of PE2 exceeds the edge strength of PE1. The rule is to ignore PE1 and consider PE2 as initiating a new bar code element (space element). Thus, the duration of the time labeled d in the positive polarity signal 50 is considered as being part of the previous bar code element, that is, the bar code element that commenced at the negative edge or impulse labeled NE1 in the negative polarity signal 52.

In the situation where the edge strength of PE2 exceeds PE1 and, accordingly, the first edge is to be ignored, ideally, the DBP line 34 would toggle on the second edge PE2 and ignore the first edge PE1. However, this is difficult to implement in an analog system since large amounts of memory would be required so the DBP signal 34 could be stored and delayed until it is clear from an analysis of two consecutive same polarity edges which edge is the proper one to toggle the DBP signal on.

It turns out to be easier to implement the decision logic using both the digitizer 32 and the decoder 36 and a short duration correction impulse imposed on the DBP line 34 when two consecutive same polarity impulses are detected by the digitizer. A correction impulse is generated and imposed on the DBP signal 34 when a second edge exceeding the threshold (+/−T) is sensed and the second edge is of the same polarity as the first edge exceeding the threshold and the second edge is of greater edge strength (greater in absolute magnitude) than the first edge. Two correction impulses labeled I1 and I2 are shown in the DBP signal 34 of FIG. 3. As can be seen, the correction impulses I1, I2 are in opposite logic state to the current state of the DBP line 34, that is, if the DBP line was in a low state, a positive correction impulse would be generated and if the DBP line was in a high state, a negative correction impulse would be generated (like I1 and I2).

The correction impulses I1, I2, when received by the decoder 36 are interpreted as indicated that the previous DBP change of state or transition is invalid and should be reversed. This reversal is shown in the "corrected" DBP signal 60 in FIG. 3. The impulse I1 tells that decoder 36 that the change of state in the DBP signal 34 from low to high at PE1 should be reversed. Stated another way, the impulse I1 tells the decoder 36 that the positive edge PE1 should be ignored and the DBP signal 34 should be considered as remaining in a low state until PE2 is received. This correction can be seen in the "corrected DBP signal 60. Essentially, the decoder 36 internally and retroactively corrects the DBP signal 34 upon receiving the correction impulses I1, I2.

The correction impulse I2 causes the decoder 36 to increase the duration of bar code element B1 from T2 to T2+T3 (as can be seen in the corrected DBP signal 60) and causes the decoder 36 to reduce the duration of the bar code element S1 from T3+T4+T5 to T4+T5 (also as can be seen in the corrected DBP signal 60). Since bar code element width is directly proportional to signal duration, the width of bar code element B1 is increased and the width of bar code element S1 is decreased.

The correction impulses I1, I2 should have a duration much shorter than a duration of the shortest duration bar code element so that the decoder 36 properly identifies the correction impulse as a marker and not as a short duration (narrow width) bar code element.

Implementation of DBP Correction Logic

One of skill in the art will recognize that there are many ways to implement the DBP same polarity correction logic outlined above in both circuitry, hardware and/or software and it is the intent of the present invention to cover all such implementations. One straightforward implementation to generate the correction impulses (such as I1, I2 shown in the DBP 34 in FIG. 3 and explained above) is the impulse generation circuit shown generally at 70 in FIG. 4. The impulse generation circuit 70 is part of the digitizer 32, but may be embodied as a separate circuit or integrated into the digitizer electronics and/or programming.

As can be seen in FIG. 4, the impulse generation circuit 70 includes a sample and hold circuit 72 which receives as an input the analog voltage signal 30. The sample and hold circuit 72 is shown in more detail in FIG. 5. The sample and hold circuit 72 remembers the voltage of the last detected edge. A comparator 74 compares the voltage of the last detected edge with the voltage of the present edge. If the previous edge voltage (input 2) of the comparator 74 is lower in magnitude that the current edge voltage (input 1) of the comparator, then an output 76 of the comparator 74 is logic 1, otherwise the output of the comparator is logic 0. The binary output 76 of the comparator 74 is fed into a logic circuit 78 along with the positive polarity signal 50 and the negative polarity signal 52.

The logic circuit 78 generates a binary output 80 pursuant to the logic table 82 shown in FIG. 6 which is implemented in the logic circuit 78. Again, as can be seen in FIG. 4, the output 80 of the logic circuit 78 and the positive polarity signal 50 are input to a logic AND gate 84. When both inputs 80 and 50 are logic high, a positive impulse output 86 (PI in FIG. 4) is generated by the AND gate 84 which toggles the DBP signal high. Similarly, the output 80 of the logic circuit 78 and the negative polarity signal 52 are input to a second logic AND gate 88. When both inputs 80 and 52 are logic high, a negative impulse output 90 (NI in FIG. 4) is generated by the AND gate 88 which toggles the DBP signal low (like the correction impulses I1 and I2 in the DBP signal 43 in FIG. 3).

The positive impulse output PI 86 and the negative impulse output Ni 90 are momentary outputs because the positive polarity signal 50 and the negative polarity signal 52 generated by the digitizer 32 are both very short duration impulses (as can be seen in FIG. 3), thus, the outputs from the AND gates 84, 88 are similarly short duration pulses. The PI and NI impulse outputs of the impulse generation circuit 70 are coupled to the DBP line 34 so that correction impulses are imposed on the DBP signal.

Alternate Embodiment of Digitizer

If the digitizer 32 is a mixed analog-digital design, which contains an A/D converter and also provides digital values for edge strength (voltage magnitudes) transitions, then the impulse generation circuit 70 shown in FIGS. 4–6 and explained above is not needed. In this embodiment, the output from the digitizer 32 includes the DBP signal 34

Figure 7A:
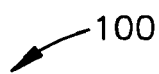
FIG. 7A is first portion of a flow chart for an error correction algorithm that obviates the need for an impulse generation circuit.

(without correction impulses inserted), the positive polarity signal 50, the negative polarity signal 52, the edge position signal 54, and additionally includes edge strength data for each edge or transition. With the addition of an algorithm embodied in the C program set forth at 100 in FIGS. 7A and 7B, the data from the digitizer 32 may be directly utilized by the decoder 36 to correct the DBP signal (like the corrected DBP signal 60) and decode the bar code pattern.

Essentially, the algorithm 100 provides the decision logic discussed above with regard to the situation where two consecutive same polarity, above the threshold edges are detected on either the positive polarity line 50 or the negative polarity line 52. The algorithm 100 incorporates the following logic:

1) If an absolute magnitude of the first edge is greater than or equal to an absolute magnitude of the second edge, that is, an edge strength of the first edge is greater than or equal to an edge strength of the second edge, the second edge is ignored. That is, the DBP signal 34 will toggle on the first edge and the second edge will be ignored.

2) If an absolute magnitude of the second edge is greater than an absolute magnitude of the first edge, that is, an edge strength of the second edge exceeds the edge strength of the first edge, the first edge is ignored and the second edge will be considered the transition to a new bar code element.

Such an algorithm may also be implemented in hardware, for example, in a field programmable gate array (FPGA) device.

While the present invention has been described with a degree of particularity, it is the intent that the invention includes all modifications and alterations from the disclosed design falling with the spirit or scope of the appended claims.

I claim:

1. A laser scanner for reading a bar code having a plurality of bar code elements, the laser scanner comprising:
   a) a laser generating a beam scanned over a target bar code;
   b) photodetector circuitry receiving light reflected from the target bar code and generating a time-varying analog signal representative of the target bar code;
   c) a digitizer coupled to the photodetector circuitry and receiving as an input the analog signal of the photodetector circuitry and generating:
      1) a digital bar code pattern signal toggling between a first state and a second state, the digital bar code pattern signal being switched to the first state when a positive polarity edge of the analog signal is sensed having a magnitude exceeding a first threshold and switching to the second state when a negative polarity edge of the analog signal is sensed having a magnitude exceeding a second threshold; and
      2) a short duration correction impulse generated when a second edge is sensed wherein the second edge has the same polarity as an immediately preceding first edge and further wherein a magnitude of the second edge is greater than a magnitude of the first edge, the impulse signal being imposed on the digital bar code pattern signal and having a state opposite of a present state of digital bar code pattern signal; and
   d) a decoder coupled to the digitizer, receiving the digital bar code pattern signal, determining widths of successive bar code elements of the target bar code, and decoding the target bar code, a width of a bar code element corresponding to a duration of an interval when the digital bar code pattern signal remains in a given one of the first and second states, except that when a short duration correction impulse is sensed on the digital bar code pattern signal, a state of an interval immediately prior to the impulse is interpreted by the decoder to be an opposite state of the state of the interval and a duration of the interval is added to a duration of an interval immediately preceding the interval.

2. The laser scanner of claim 1 wherein the correction impulse has a duration shorter than a duration of a portion of the digital bar code pattern signal corresponding to a bar code element having narrowest width of the plurality of bar code elements.

3. The laser scanner of claim 1 wherein the correction impulse is generated by a correction impulse generation circuit that includes a sample and hold circuit and a comparator for comparing magnitudes of successive edges.

4. The laser scanner of claim 3 wherein the correction impulse generation circuit further includes a first AND gate generating a positive-going correction impulse when two successive negative polarity edges are sensed and a magnitude of the second edge is greater than a magnitude of the first edge and a second AND gate generating a negative-going correction impulse when two successive positive polarity edges are sensed and a magnitude of the second edge is greater than a magnitude of the first edge.

5. The laser scanner of claim 1 wherein the digitizer generates a positive polarity signal wherein an impulse generated when a positive polarity edge having a magnitude above the first threshold is sensed.

6. The laser scanner of claim 5 wherein the digitizer generates a positive polarity signal wherein an impulse generated when a negative polarity edge having a magnitude above the second threshold is sensed.

7. The laser scanner of claim 6 wherein the digitizer generates an edge position signal wherein an impulse generated when a positive polarity edge having a magnitude above the first threshold is sense or when a negative polarity edge having a magnitude above the second threshold is sensed.

8. A digitizer for a laser scanner utilized for reading a bar code having a plurality of bar code elements, the digitizer comprising:
   a) circuitry for receiving an analog signal representative of the pattern of a target bar code;
   b) circuitry for analyzing the analog signal and generating a digital bar code pattern signal toggling between a first state and a second state, the digital bar code pattern signal being switched to the first state when a positive polarity edge of the analog signal is sensed having a magnitude exceeding a first threshold and switching to the second state when a negative polarity edge of the analog signal is sensed having a magnitude exceeding a second threshold; and
   c) impulse generation circuitry for generating a short duration correction impulse when a second edge is sensed wherein the second edge has the same polarity as an immediately preceding first edge and further wherein a magnitude of the second edge is greater than a magnitude of the first edge, the impulse signal being imposed on the digital bar code pattern signal and having a state opposite of a present state of digital bar code pattern signal.

9. The digitizer of claim 8 wherein the correction impulse has a duration shorter than a duration of a portion of the digital bar code pattern signal corresponding to a bar code element having narrowest width of the plurality of bar code elements.

10. The digitizer of claim 9 wherein the impulse generation circuitry includes a sample and hold circuit and a comparator for comparing magnitudes of successive edges.

11. The digitizer of claim 10 wherein the impulse generation circuitry further includes a first AND gate generating a positive-going correction impulse when two successive negative polarity edges are sensed and a magnitude of the second edge is greater than a magnitude of the first edge and a second AND gate generating a negative-going correction impulse when two successive positive polarity edges are sensed and a magnitude of the second edge is greater than a magnitude of the first edge.

12. The digitizer of claim 9 wherein the digitizer generates a positive polarity signal wherein an impulse generated when a positive polarity edge having a magnitude above the first threshold is sensed.

13. The digitizer of claim 12 wherein the digitizer generates a positive polarity signal wherein an impulse generated when a negative polarity edge having a magnitude above the second threshold is sensed.

14. The digitizer of claim 13 wherein the digitizer generates an edge position signal wherein an impulse generated when a positive polarity edge having a magnitude above the first threshold is sense or when a negative polarity edge having a magnitude above the second threshold is sensed.

15. A method of reading a bar code having a plurality of bar code elements utilizing a laser scanner having a laser, photodetector circuitry, a digitizer and a decoder, the steps of the method comprising:
   a) generating a laser beam by energizing the laser and scanning the beam over a target bar code;
   b) directing light reflected from the target bar onto the photodetector circuitry, the photodetector circuitry generating time-varying analog signal representative of the target bar code;
   c) inputting the time-varying analog signal of the photodetector circuitry to the digitizer, the digitizer generating:
      1) a digital bar code pattern signal toggling between a first state and a second state, the digital bar code pattern signal being switched to the first state when a positive polarity edge of the analog signal is sensed having a magnitude exceeding a first threshold and switching to the second state when a negative polarity edge of the analog signal is sensed having a magnitude exceeding a second threshold; and
      2) a short duration correction impulse generated when a second edge is sensed wherein the second edge has the same polarity as an immediately preceding first edge and further wherein a magnitude of the second edge is greater than a magnitude of the first edge, the impulse signal being imposed on the digital bar code pattern signal and having a state opposite of a present state of digital bar code pattern signal; and
   d) inputting the digital bar code pattern signal with imposed correction impulses to the digitizer, the digitizer determining widths of successive bar code elements of the target bar code and decoding the target bar code wherein a width of a bar code element corresponding to a duration of an interval when the digital bar code pattern signal remains in a given one of the first and second states, except that when a short duration impulse is sensed on the digital bar code pattern signal, a state of an interval immediately prior to the impulse is interpreted by the decoder to be an opposite state of the state of the interval and a duration of the interval is added to a duration of an interval immediately preceding the interval.

16. The method of reading a bar code of claim 15 wherein the correction impulse has a duration shorter than a duration of a portion of the digital bar code pattern signal corresponding to a bar code element having narrowest width of the plurality of bar code elements.

17. The method of reading a bar code of claim 15 wherein the correction impulse is generated by a correction impulse generation circuit that includes a sample and hold circuit and a comparator for comparing magnitudes of successive edges.

18. The method of reading a bar code of claim 17 wherein the correction impulse generation circuit further includes a first AND gate generating a positive-going correction impulse when two successive negative polarity edges are sensed and a magnitude of the second edge is greater than a magnitude of the first edge and a second AND gate generating a negative-going correction impulse when two successive positive polarity edges are sensed and a magnitude of the second edge is greater than a magnitude of the first edge.

19. The method of reading a bar code of claim 15 wherein the digitizer generates a positive polarity signal wherein an impulse generated when a positive polarity edge having a magnitude above the first threshold is sensed.

20. The method of reading a bar code of claim 19 wherein the digitizer generates a positive polarity signal wherein an impulse generated when a negative polarity edge having a magnitude above the second threshold is sensed.

21. The method of reading a bar code of claim 20 wherein the digitizer generates an edge position signal wherein an impulse generated when a positive polarity edge having a magnitude above the first threshold is sense or when a negative polarity edge having a magnitude above the second threshold is sensed.

\* \* \* \* \*